Patented Nov. 1, 1938

2,135,061

UNITED STATES PATENT OFFICE 2,135,061

FLUID METER TESTER

Walter C. Wagner, Ardmore, and Frederick Strattner, Manoa, Pa.

Application April 1, 1935, Serial No. 14,066

9 Claims. (Cl. 73—51)

The object of our invention is to provide a device for testing fluid meters, especially gas meters used for metering gas supplied to a customer's premises, and for recording the results of the test.

Our device is particularly useful in connection with the device described in our co-pending application, Serial No. 721,652, filed April 21st, 1934, now Patent No. 2,039,506.

Our invention consists of a prover for fluid meters of any well-known type, a meter to be tested, a rockable support for holding the meter to be tested, a record holder mounted on the prover, a marker mounted on a movable part of the prover for movement relative to the record and proportional to the fluid passing through the meter, and means responsive to the oscillations of the meter to be tested, which oscillations are caused by the passage of fluid through the meter, which means cause said marker to make a record after a predetermined number of oscillations of said meter.

Our invention will be illustrated in the annexed drawings forming part hereof and described in the following specification, at the end whereof the novel features of our invention will be specifically pointed out and claimed.

Figure 1:
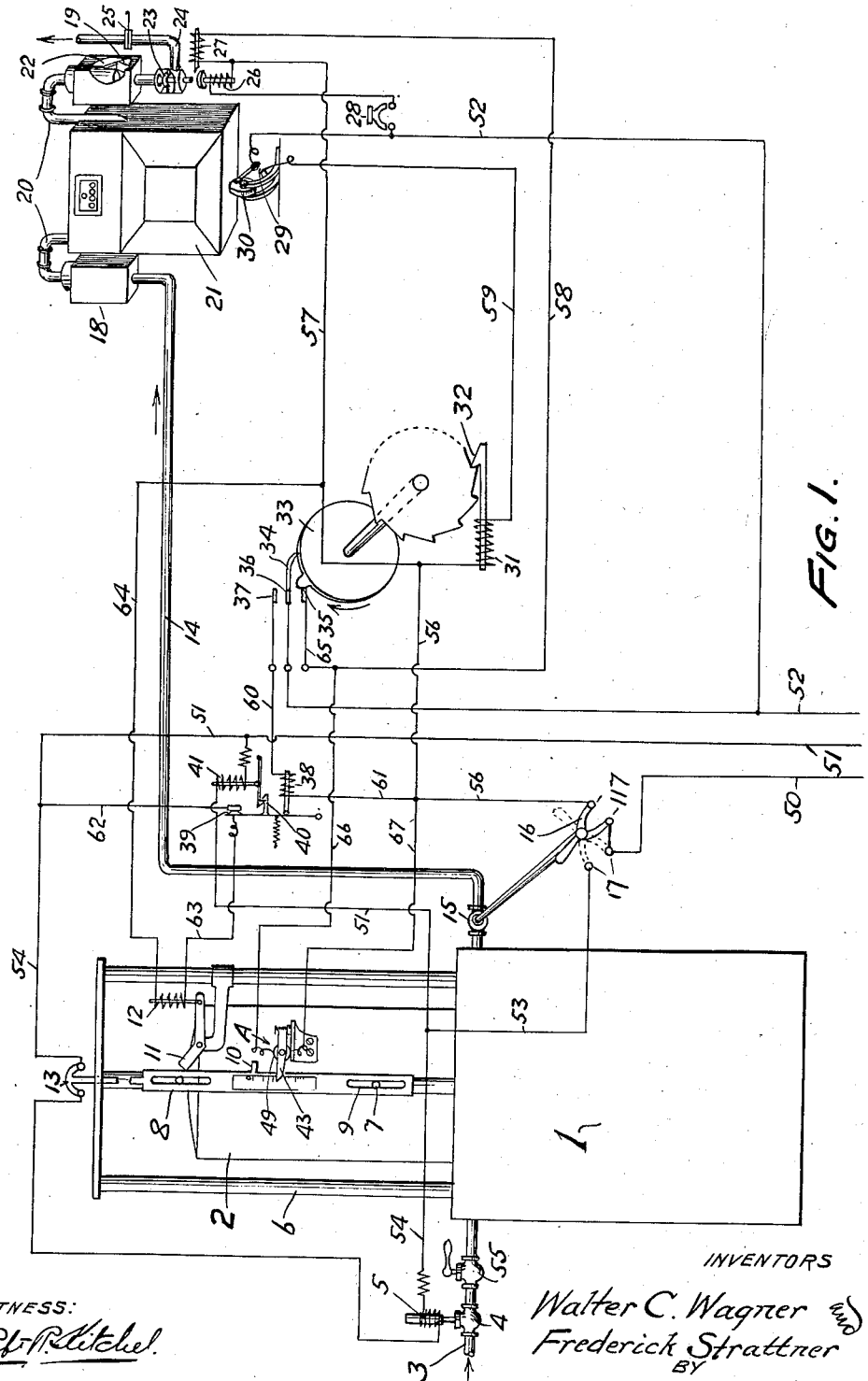
Fig. 1 is a diagram showing our device and electric circuit connections thereof.

As is best seen in Fig. 1, our device employs a prover generally indicated at 1, which may be of any well-known type and which includes a movable art such as a bell 2. Mounted on bell 2, so as to be movable therewith, is a recording means generally indicated at A, and disclosed in detail in Figs. 2 and 3. An inlet pipe 3 is controlled by a valve 4 which is, in turn, controlled by a solenoid 5. About bell 2 there may be located supports 6, one of which carries pins 7 upon which is supported a scale 8 as by slots 9. Scale 8 carries on a part thereof a projection 10, which co-operates with recorder A as will be later described in detail. Also mounted on supports 6 is a latch 11 controlled by a solenoid 12, which latch locks scale 8 in position when solenoid 12 is energized. Switch 13 is mounted on supports 6 and aligned with scale 8 so as to be actuated thereby. Switch 13 is normally closed by gravity or other means. Connection 14 serves as an outlet from the prover, and is controlled by a valve 15 which has formed as a part thereof or movable therewith a switch 16, which has two positions co-operating with stationary switch contacts 17 and 117.

Connection 14 leads from prover 1 to the rockable supporting means generally indicated at 18, which include knife-edges 19 on which is pivotally supported meter bar 20 from which the meter 21, which is to be tested, is supported. Liquid-sealing means 22 are provided as a part of the rockable supporting means 18. Outlet for fluid from meter 21 is provided through valve 23, which is normally closed by gravity or other means through conduit 24 containing slider 25, which is adjustable to vary the cross-section of conduit 24 so as to provide for testing the meter 21 at various rates of flow.

Valve 23 may be stressed to open position by solenoid 26, the solenoid 26 being held in open position by solenoid 27. Push-button switch 28, which is normally open, is in series with solenoid 26.

Switch 29 is mounted beneath meter 21 and has a roller 30 in contact with the bottom of meter 21, so that each oscillation of meter 21 causes switch 29 to make and break contact. Switch 29 is in series with solenoid 31, which forms a part of a step-by-step motor generally indicated at 32. Motor 32 operates cam 33, which operates followers 34 and 35, 35 being also a contact of a switch whose other contacts are 36 and 37. Switch 36—37 is in series with solenoid 38 which operates switch 39, latch 40, operated by solenoid 41, being provided to hold switch 39 in closed position.

Figure 2:
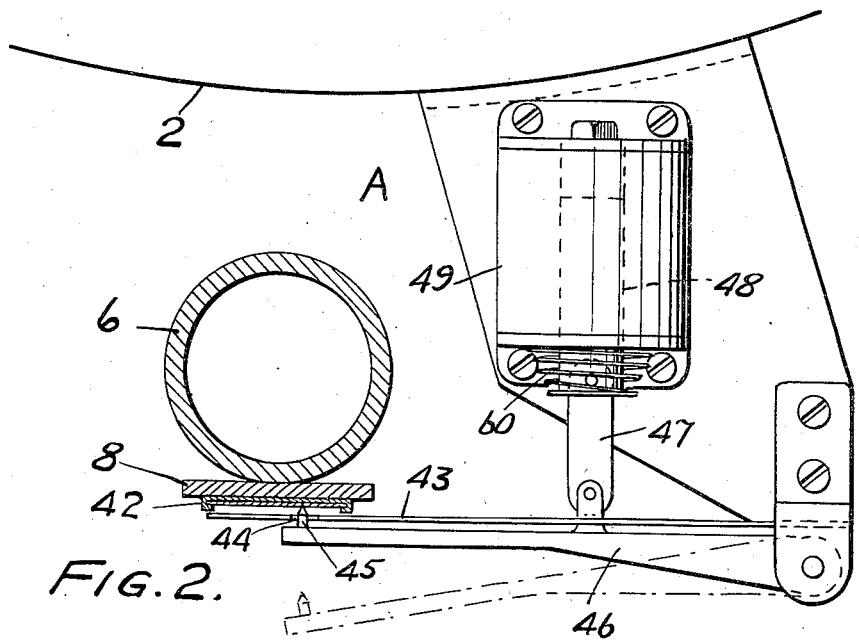
Fig. 2 is a plan view, with parts in vertical section, of the recording means.
Figure 3:
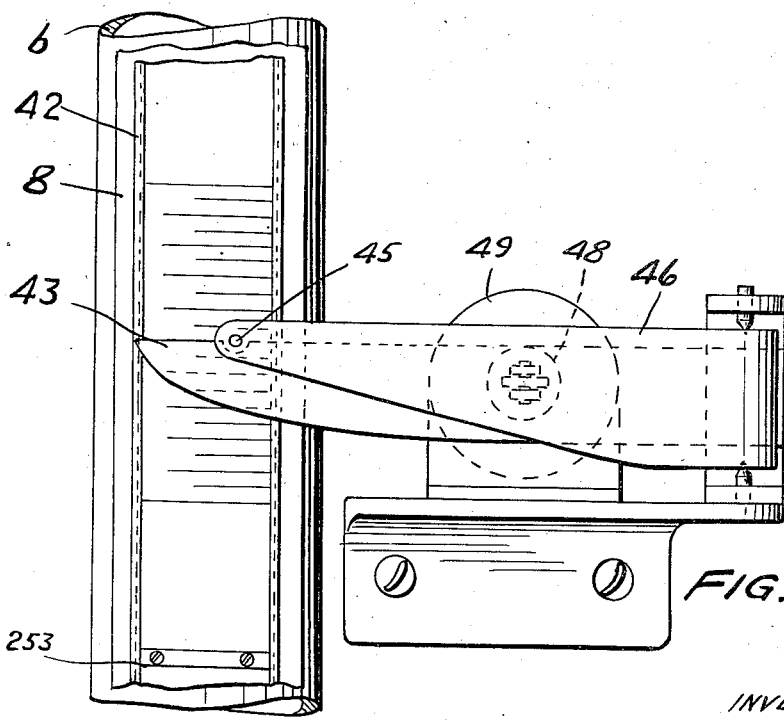
Fig. 3 is an elevational view of the device shown in Fig. 2.

Referring now to Figs. 2 and 3, there is shown our recorder generally indicated at A, which consists of a card holder 42 or other record-receiving means such as a sheet of wax, smoked glass, or the like. Mounted on bell 2 is a pointer 43, which travels up-and-down with bell 2. Pointer 43 has a hole 44 therein through which may pass a stylus or other marking means 45, which is mounted on a pivoted arm 46 also carried on bell 2. Arm 46 is connected by a link 47 to the core 48 of a magnetic coil 49, which serves, when energized, to stress marker 45 against the card carried by card holder 42. Card holder 42 carries a stop 253 thereon, so that the card carried by the card holder 42 is readily located with a zero mark on the card opposite the projection 10 on scale 8, so that pointer 43 starts from the zero position as will be explained hereinafter.

The operation of our device is as follows: Current is supplied to the device from a circuit consisting of wires 50, 51 and 52. Wire 50 is connected to switch contact 17, from whence wires 53 and 54 lead through solenoid 5 and switch 13 to the opposite side of the circuit at wire 51. Closing valve 15 therefore energizes solenoid 5 and opens valve 4, so that a supply of compressed air or other fluid for testing meter 21 is supplied through pipe 3 and valve 4. When valve 55 is open, valve 15 being still closed, compressed air enters prover 1 and raises bell 2 and scale 8 by means of the engagement between pointer 43 and projection 10. Bell 2 rises until scale 8 opens switch 13, which de-energizes solenoid 5 and thus closes valve 4. Valve 55 should then be closed. Valve 15 may then be opened, moving switch 16 into contact with stationary contacts 117 and allowing the flow of fluid through conduit 14 to rockable support 18 and meter 21 which is to be tested. Closing switch contacts 117 permits current to flow from lead 50 through contacts 117, leads 56 and 57, and solenoid 26, to push-button 28 which is connected to the opposite side of the circuit at lead 52. When push-button 28 is closed, solenoid 26 is energized and thereby opens valve 23, and is held with valve 23 in open position by the armature of solenoid 27. The armature of solenoid 27 is stressed by a spring or other means to hold solenoid 27 with valve 23 in open position until solenoid 27 is energized. Solenoid 27 is connected by lead 58, lead 65, and switch contacts 35—36 to lead 52, which forms the opposite side of the circuit. Opening of valve 23 permits fluid to pass from prover 1 through meter 21, which causes oscillation of meter 21 and consequent opening and closing of switch 29. This actuation of switch 29 energizes solenoid 31 through lead 59 and lead 56, and causes consequent operation of step-by-step motor 32 and movement of cam 33. For a limited time, cam 33 moves from the position in which it is shown in Fig. 1 without coming into contact with follower 34, so that fluid passes through meter 21 and purges it, while at the same time bell 2 falls and permits the re-closing of switch 13. After this limited time of preparation, cam 33 engages follower 34 and thereby closes contacts 36 and 37. Current flows through lead 52, contacts 36—37, lead 60, solenoid 38, lead 61, lead 56, contacts 117 to the other side of the circuit at 50. Energization of solenoid 38 closes switch 39 and causes 40 to retain switch 39 in closed position. Closure of switch 39 causes current to flow through lead 51, lead 62, switch 39, lead 63, solenoid 12, lead 64, lead 57, lead 56, contacts 117 to lead 50. This energization of solenoid 12 closes locking means 11 against scale 8 and locks the scale in zero position. Valve 23 remains open, permitting the flow of fluid from bell 2 through meter 21, thereby causing a predetermined number of oscillations of meter 21 and consequent operations of switch 29 and movements of cam 33. Simultaneously, pointer 43 moves within bell 2 away from projection 10 and over scale 8. After a predetermined number of oscillations of meter 21, cam 33 closes contact 35 against contact 36. Current flows from lead 52, contacts 36—35, lead 65, lead 66, solenoid 49, lead 67 to lead 56. Current simultaneously flows from lead 52 through contacts 36—35, lead 65, lead 58, solenoid 27, and lead 57 to lead 56. This causes energization of latch 27 which releases valve 23, thereby causing it to close. Simultaneously, solenoid 49 is actuated, causing marker 45 (not shown on Fig. 1) to make a record upon the card carried on scale 8. It will thus be seen that the test, once it has been set in operation by pressing push-button 28, is entirely automatic in character, and stops when meter 21 has made a predetermined number of oscillations which correspond, if the meter is in proper order, to a certain volume of gas having passed through the meter. The record made by the card carried by scale 8 shows whether the meter has passed the correct amount of fluid or not.

Figure 4:
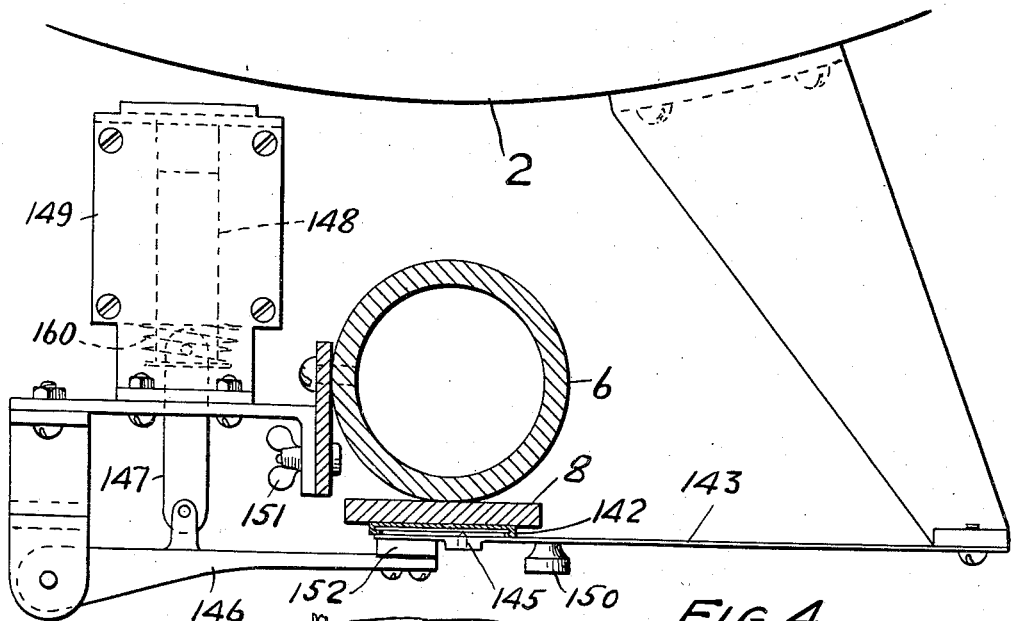
Fig. 4 is a plan view of a modified form of recording means.
Figure 5:
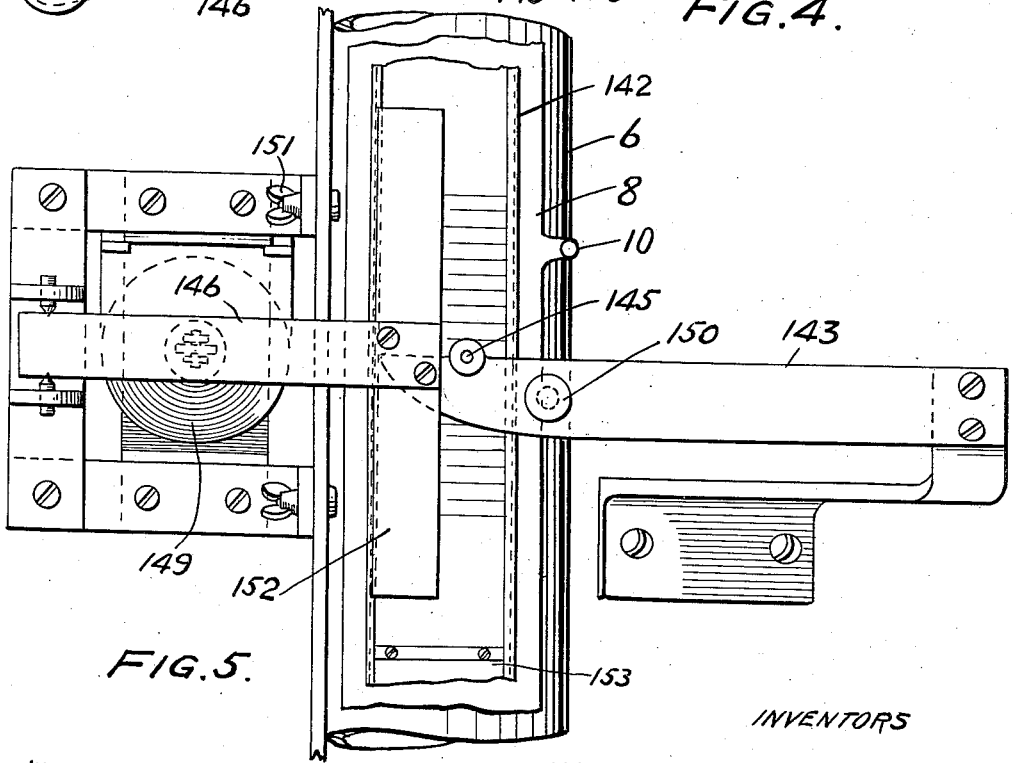
Fig. 5 is an elevational view of the device shown in Fig. 4.

In Figs. 4 and 5 is shown a modification of our device, in which pointer 143 is mounted so as to be movable with bell 2 and carries a stylus or other marking device 145 and also a push-button or other manually-operated means 150 whereby, if desired, stylus 145 may be pressed into contact with the card carried by card holder 142 on scale 8. Solenoid 149 is carried on stationary support 6, and is adjustable vertically relative to support 6 by means of wing-nut 151. Link 147 connects core 148 of solenoid 149 with pivoted lever 146. As is best seen in Fig. 5, lever 146 carries at its outer end an elongated portion 152 extending parallel to card holder 142 and overlying the end of spring 143, so that, when solenoid 149 is energized, lever 146 or portion 152 presses upon the end of pointer 143 and causes stylus 145 to contact with the card on card holder 142. Card holder 142 carries stop 153 thereon, so that a card may be accurately positioned within card holder 142, so that the zero mark on the card is opposite projection 10 on scale 8, and consequently the pointer 143 starts for proper position.

We do not intend to be limited save as the scope of the prior art and of the attached claims may require.

We claim:—

1. In a device for testing fluid meters, the combination of, a card for receiving a record, a card holder for accurately positioning said card, a marker movable parallel to the surface of said card in response to movement of a part of said device, which part moves proportionately to the volume of fluid passing through said meter, and movable vertical to the surface of said card, a pivoted lever movable so as to be operable to cause said marker to move vertically to the surface of said card, a solenoid connected to said lever to actuate it upon energization of said solenoid, a switch mounted for circuit opening and closing movement in response to movements of the meter being tested and means controlled by said switch to control the energization of said solenoid after a predetermined number of movements of said switch.

2. In a device for testing fluid meters, the combination of, a card for receiving a record, a card holder for accurately positioning said card, a marker movable parallel to the surface of said card in response to movement of a part of said device, which part moves proportionately to the volume of fluid passing through said meter, and movable vertical to the surface of said card, a first lever supporting said marker and having a portion free to travel in a path with said marker, a second pivoted lever having an elongated portion overlying the path of travel of said portion of said first lever, a solenoid connected to said second pivoted lever and adapted upon energization to actuate said second pivoted lever and said first lever and said marker so that said marker makes a record on said card, a switch mounted for circuit opening and closing movement in response to movements of the meter being tested, and means controlled by said switch to control the energization of said solenoid.

3. In a device for testing fluid meters, the combination of, a record-receiving means, holding means for providing for the accurate location of said record-receiving means, a marker mounted on a movable part of said device, which part is movable proportionately to the volume of fluid passing through said meter being tested, said marker being movable parallel to the surface of said record-receiving means and movable vertical to the surface of said record-receiving means, electrical means for causing said marker to move vertically relative to said record-receiving means and make a record thereon, a switch responsive to movements of the meter being tested, and means controlled by said switch and adapted to actuate said electrical means after a predetermined number of movements of said meter.

4. A fluid meter tester, comprising in combination, a prover having a part which moves proportionately with the flow of fluid from said prover, means mounting a meter to be tested mounted so as to move upon the passage of fluid therethrough, a circuit maker-and-breaker responsive to the movements of said meter, a valve controlling the flow of fluid from said prover through said meter and controlled by said circuit maker-and-breaker so as to be closed after a predetermined number of movements of said meter, and marking means mounted so as to move proportionately to the movement of the movable part of said prover and controlled so as to be actuated by said circuit maker-and-breaker when said circuit maker-and-breaker closes said valve.

5. A fluid meter tester, comprising in combination, a prover having a bell and a fluid inlet valve and a hand-operated outlet valve, said inlet valve being normally closed, electrical means for opening and closing said inlet valve, second electrical means connected in series with said electrical means for de-energizing said electrical means and thereby closing the inlet valve when the bell rises to its upper limit, a scale riding on said bell with lost motion therebetween, a cradle providing a rockable support for the meter to be tested, a valve at the outlet of the meter, a connection from the prover outlet valve to the meter, an electric controller operated with the prover outlet valve, a first electric circuit including said electrical means and said second electrical means and arranged to be closed by said electric controller in one position thereof, a second electric circuit arranged to be closed by said electric controller in another position thereof, a circuit maker-and-breaker in said second electric circuit and operated by the rocking of the meter due to the passage of fluid from said prover through said meter, mechanical and electrical connections also in said second electric circuit and controlled by the circuit maker-and-breaker and arranged to close said meter outlet valve, a push-button arranged to close an electric circuit and thereby to open said meter outlet valve, and a marker responsive to the last of a predetermined number of actuations of said circuit maker-and-breaker to record movement of said bell during said predetermined number of actuations.

6. A tester for fluid meters comprising, a rockable support for a meter to be tested, said meter being mounted on said support and caused to oscillate on said support by the passage of fluid through the meter, a prover for testing said meter and having a movable part which travels proportionately to the volume of fluid which passes through said prover and said meter, a record-receiving means, a marker movable proportionately to the movements of said movable part of said prover adjacent said record-receiving means, means including a cam arranged to cause said marker to make a record on said record-receiving means, and a device responsive to the oscillations of said meter and actuating said cam at each oscillation so that said cam causes said marker to operate after a predetermined number of oscillations of said meter.

7. A tests for fluid meters comprising, a rockable support for a meter to be tested, said meter being mounted on said support and caused to oscillate on said support by the passage of fluid through the meter, a prover for testing said meter and having a movable part which travels proportionately to the volume of fluid which passes through said prover and said meter, a record-receiving means, a marker movable proportionately to the movements of said movable part of said prover adjacent said record-receiving means, means including a cam arranged to cause said marker to make a record on said record-receiving means, an electric motor connected to said cam to move said cam, an electric switch located to be opened and closed by the oscillations of said meter, and an electric circuit including said motor and said switch so that said motor is operated when said switch is closed.

8. A tester for fluid meters comprising, a rockable support for a meter to be tested, said meter being mounted on said support and caused to oscillate on said support by the passage of fluid through the meter, a prover for testing said meter and having a movable part which travels proportionately to the volume of fluid which passes through said prover and said meter, a conduit for fluid connecting said prover and said meter in series, a valve in said conduit controlling the outlet of fluid from said prover and said meter, a latch co-operating with said valve to hold it in open position, a record-receiving means, a marker movable proportionately to the movements of said movable part of said prover adjacent said record-receiving means, means including a cam arranged to cause said marker to make a record on said record-receiving means and to cause said latch to free said valve for closing movement, and a device responsive to the oscillations of said meter actuating said cam at each oscillation so that said cam causes said marker and said latch to operate after a predetermined number of oscillations of said meter.

9. A fluid meter tester, comprising in combination, a prover having a part which moves proportionately to the flow of fluid from said prover, means mounting a meter to be tested so as to move upon the passage of fluid therethrough, a valve controlling the flow of fluid from said prover through said meter, a circuit maker-and-breaker arranged to be opened and closed by the movements of said meter, a step-by-step electric motor arranged to be moved one step upon each closing of said circuit maker-and-breaker, a cam driven by said motor, marking means mounted so as to move proportionately to the movement of the movable part of said prover, a solenoid-operated latch arranged when de-energized to hold said valve in open position and when energized to release said valve for closing movement, a switch arranged so as to be actuated by said cam, and electric circuit connections including said switch and said marking means and said latch arranged so that upon actuation of said switch by said cam said marking means and said latch are operated.

WALTER C. WAGNER.
FREDERICK STRATTNER.